(12) United States Patent
Thiagarajan (10) Patent No.: US 9,244,152 B1
(45) Date of Patent: Jan. 26, 2016

(54) DETERMINING DEVICE LOCATIONS USING MOVEMENT, SIGNAL STRENGTH

(71) Applicant: Amazon Technologies, Inc., Reno, NV (US)

(72) Inventor: Arvind Thiagarajan, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/907,706

(22) Filed: May 31, 2013

Related U.S. Application Data

(60) Provisional application No. 61/654,149, filed on Jun. 1, 2012.

(51) Int. Cl.
*G01S 5/10* (2006.01)
*H04W 64/00* (2009.01)
*G01S 5/02* (2010.01)

(52) U.S. Cl.
CPC ................. *G01S 5/10* (2013.01); *H04W 64/00* (2013.01); *G01S 5/0252* (2013.01); *G01S 5/0268* (2013.01); *G01S 5/0294* (2013.01)

(58) Field of Classification Search
CPC ..... H04W 4/043; H04W 4/028; H04W 4/026; H04W 4/025; H04W 4/027; H04W 52/0254; H04W 52/0258; G01S 5/0252; G01S 5/02; G01S 5/0278; G01S 5/0263; G01S 5/0045; G01S 5/54; G01S 5/63; G01S 1/30; G01S 15/0284; G01S 15/0294; G01S 15/04; G01S 15/06; G01S 15/10; G01S 15/12; G01S 19/48; G01S 5/0027; G01S 5/0294; G01S 5/22; G01S 5/30; G01C 21/3484; G01C 21/20; G01C 21/3492; H04M 1/72572; G06K 9/6297

USPC ............ 340/539.13; 455/456.3, 456.2, 456.5, 455/456.6, 456.1
See application file for complete search history.

(56) References Cited

U.S. PATENT DOCUMENTS

| | | | |
|---|---|---|---|
| 8,386,422 B1* | 2/2013 | Kadous et al. ................ 707/609 |
| 8,412,234 B1* | 4/2013 | Gatmir-Motahari et al. ......................... 455/456.1 |
| 2005/0037776 A1* | 2/2005 | Perez-Breva et al. ....... 455/456.1 |
| 2007/0149216 A1* | 6/2007 | Misikangas ................. 455/456.1 |
| 2007/0168127 A1* | 7/2007 | Zaruba et al. ................. 701/220 |
| 2009/0096670 A1* | 4/2009 | Mizuochi et al. ......... 342/357.12 |
| 2011/0092222 A1* | 4/2011 | Kuo et al. .................. 455/456.1 |
| 2012/0209799 A1* | 8/2012 | Ohama et al. .................... 706/20 |
| 2013/0045752 A1* | 2/2013 | Fukumoto et al. ......... 455/456.1 |
| 2013/0179075 A1* | 7/2013 | Haverinen .................... 701/525 |

(Continued)

*Primary Examiner* — Nizar Sivji
(74) *Attorney, Agent, or Firm* — Lee & Hayes, PLLC (57) ABSTRACT

Techniques for precisely determining a location of a mobile computing device based on both wireless signal strengths measured at the mobile computing device and movement of the device. The wireless signal strengths may represent the strength of a connection between the device and wireless access points (WAPs), cellular towers, or the like. Furthermore, the techniques described herein may utilize movement data provided by the device. For instance, the device may include an accelerometer, a gyroscope, and/or any other components configured to recognize when a device is moving, a direction that the device is moving, or the like. In one example, the accelerometer reports when the device has moved by a certain amount, while the gyroscope reports a direction in which the device is moving. The techniques then utilize this information in addition to the wireless signal strengths to estimate locations of the device as the device moves over time.

21 Claims, 8 Drawing Sheets

(56) References Cited

U.S. PATENT DOCUMENTS

| | | | |
|---|---|---|---|
| 2013/0322674 A1* | 12/2013 | Ren et al. | 381/337 |
| 2014/0120950 A1* | 5/2014 | Fulton et al. | 455/456.1 |
| 2014/0274139 A1* | 9/2014 | Bilal et al. | 455/456.3 |

* cited by examiner

DETERMINING DEVICE LOCATIONS USING MOVEMENT, SIGNAL STRENGTH

RELATED APPLICATION

This application claims priority to U.S. Provisional Patent Application Ser. No. 61/654,149, entitled "Precise Indoor Positioning Using Probabilistic Models and Sensor Fusion", filed Jun. 1, 2012, which is incorporated herein by reference in their entirety.

BACKGROUND

Determining the location of a mobile electronic device, such as a smart phone, a tablet computing device or the like, may be helpful for a variety of reasons. For instance, if a user of the device is using a navigation application, the application may reference the current location of the device when determining directions to provide to the user to allow the user to reach a desired location. However, in order to provide directions in an accurate and timely manner, the device may need to determine its location at a very granular level of detail. In another example, a device may need to determine its location to determine recommendations to a user of the device, such as recommendations for local restaurants, shops, and the like. As such, many applications may utilize techniques for precisely determining the location of mobile computing devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed, in part, to techniques for precisely determining a location of a mobile computing device based on both wireless signal strengths measured at the mobile computing device and movement of the mobile computing device. The wireless signal strengths may represent the strength of a connection between the mobile computing device and wireless access points (WAPs), cellular towers, or the like. Furthermore, the techniques described herein may utilize movement data provided by one or more components of the mobile computing device. For instance, the device may include an accelerometer, a gyroscope, and/or any other type of component configured to recognize when a device is moving, a direction that the device is moving, or the like. In one example, the accelerometer reports when the device has moved by a certain amount, while the gyroscope reports a direction in which the device is moving. The techniques then utilize this information in addition to the wireless signal strengths to estimate locations of the device as the device moves over time.

In some instances, the techniques may precisely determine a location of a computing device in instances when a global positioning satellite (GPS) system of the device is unreliable, such as when the device is within a building. In this situation, the techniques may still determine a precise location (e.g., within 2-3 meters or better) of a mobile computing device that includes both a WiFi radio and a 3-axis accelerometer and/or gyroscope inside a building with a certain minimum density of WiFi access points (e.g., routers, specialized WiFi beacons, etc.). To do so, the techniques utilize information from existing, unmodified WAPs in a building with information from the 3-axis accelerometer, gyroscope, or other sensor that can determine the state of motion of the mobile device (stationary or moving) in real time. With the WAP and the movement information, the techniques may find the (X, Y, Z) position of the mobile device, the elevation in terms of floor number Z in the building, and a radius R which is an accurate estimate of the uncertainty in the (X, Y) 2D position.

In some instances, the techniques utilize a probabilistic model approach (e.g., a Hidden Markov Model, a particle filter, etc.) that combines WiFi signal strength information from multiple wireless scans with output from a 3-axis accelerometer, a gyroscope, or the like to precisely determine a location of a mobile computing device. By doing so, the techniques may significantly reduce significant outliers from approaches that use pure WiFi fingerprinting or pure probability distribution-based approaches. In addition, the techniques may achieve better long tail (e.g., 90th percentile) accuracy than these approaches, which in turn enable a smooth experience for a user operating the mobile device. In some instances, the techniques may operate entirely or partially on a mobile device once a relevant training database has been downloaded and cached on to the device, which enables the location estimation to work smoothly and accurately even without a reliable or persistent internet connection on the device.

The wireless signal strength used to estimate a device's location may be a strength measured at the device or measured at the WAP and provided to the device. Alternatively, the wireless signal strength may represent an indicator or value that is already computed by a wireless protocol. For instance, the device may utilize an RSSI value, a received channel power indicator (RCPI), or the like. Further, the utilized signal strength may be represented in arbitrary units or may represent a particular unit (e.g., a strength measured in dBs, etc.). As is known and as used herein, an RSSI represents a generic radio receiver technology metric that indicates a power present in a received radio signal.

In some instances, a single RSSI value for a WAP or even multiple WAPs may be insufficient to determine location accurately and reliably. As such, the techniques may combine multiple RSSI values over time for a given AP. In conjunction with information from the motion sensors, both the location and the uncertainty of the location may be precisely estimated.

In one example, the techniques utilize a Hidden Markov Model whose hidden states are square grid cells on a map, and where the observables of the Markov Model are WiFi signal strength observations. In another example, the techniques utilize particle-filter techniques. In either instance, each new WiFi scan result is treated as a new observable. To capture the typical long-tailed nature of the probability distribution of RSSI without requiring an excessive amount of training data, the techniques may utilize a range-based model which models each access point as having a range of possible RSSI values within at a particular location (e.g., a point, a grid cell, etc.), as computed from the training data. Any location whose range contains the RSSI of an observed access point is given a score, and the scores are combined over all the access points seen.

In addition, the techniques may utilize a motion sensor on the mobile computing device to update the potential locations of a device as the device moves. If the phone is stationary or approximately stationary in a given location, the probability model tends to identify the location(s) that maximize the likelihood of a sequence of fingerprints, and converge to the most accurate location over time. If the phone is moving, the probability model may reset and allows for the probabilities to shift in the device's direction of movement.

In some instances, the techniques utilize a two-step procedure where the probability model is used with initial RSSI measurements to determine a candidate set of initial location(s) of the device. To obtain better granularity, the techniques may subsequently find the best-matching (X, Y, Z) location from the candidate locations. After identifying this best-matching location and designating this as the initial location of the device, the techniques may utilize subsequent RSSI measurements and movement of the device to continually or periodically re-estimate the current location of the device.

In some instances, the techniques described herein may also estimate an uncertainty of the determined location and provide this information to a mobile device user within an indoor space. Previous approaches to compute the uncertainty or error of a location estimation simply determine alternative (X, Y) locations with WiFi fingerprints that are nearby, and thereafter determine how far these corresponding locations are from the true location. However, these approaches may systematically overestimate or underestimate the error radius, depending on the closeness criterion used for fingerprints. Therefore, the techniques described herein use an approach that weights the distance of a training fingerprint adaptively, based on how its score compares to the score of the top-scoring location. A location with a high (or similar) score to the top-scoring location is given more weight, and a location with a lower score is given less weight. By using cumulative scores from the probability model, the techniques automatically incorporate information from the motion sensor(s) and previous observed signal strengths into the uncertainty computation.

The techniques described above and below may be implemented in a number of ways and in a number of contexts. Several example implementations and contexts are provided with reference to the following figures, as described below in more detail. However, the following implementations and contexts are but a few of many.

Figure 1:
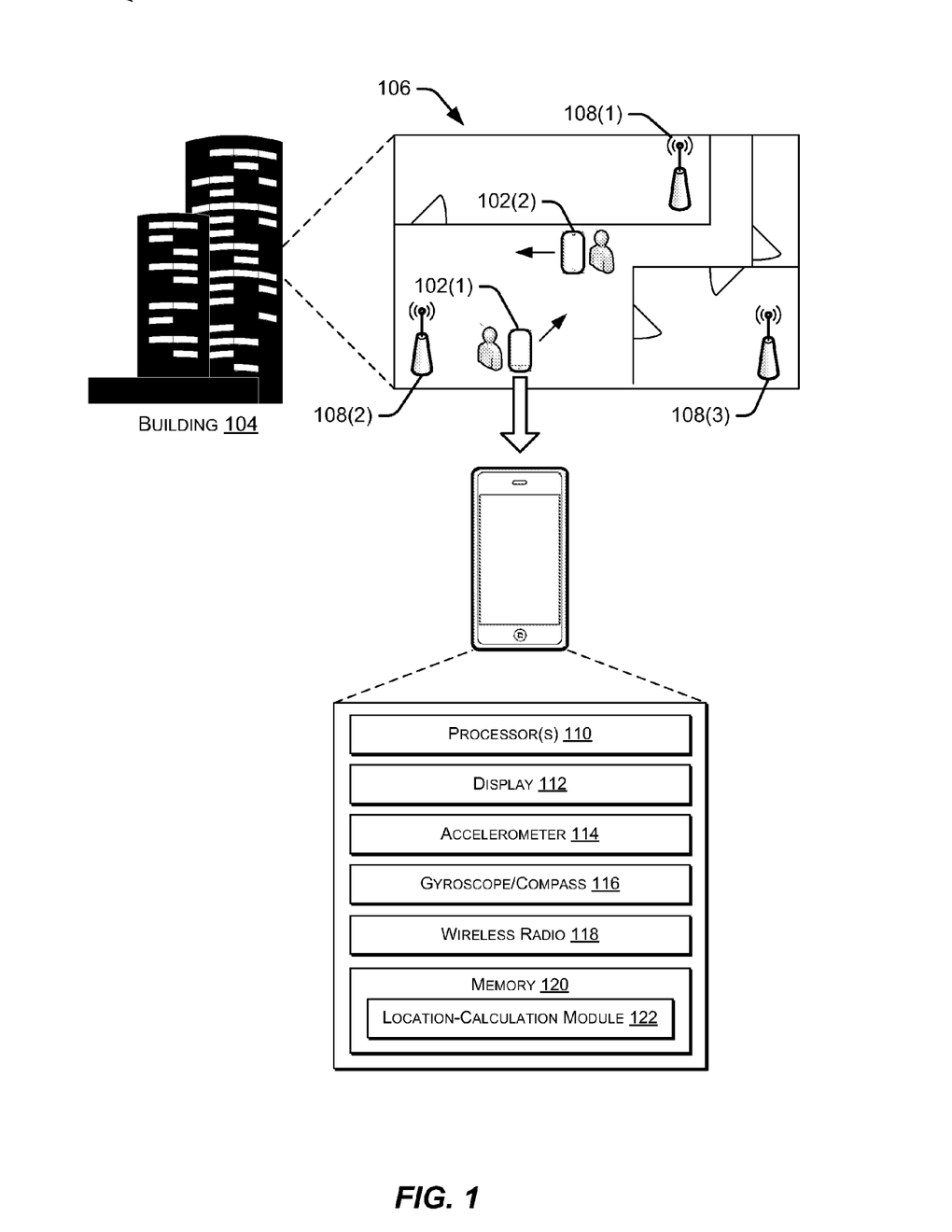
FIG. 1 illustrates an example architecture that includes two users who each carries a mobile computing device, such as a mobile phone or the like, within a building. The building includes multiple wireless access points (WAPs), which the device may utilize to determine its current location. In addition to utilizing received signal strength indications (RSSIs) from these WAPs, the client devices may utilize indications of when the devices are moving and a direction in which they are moving in order to precisely determine their current locations.

FIG. 1 illustrates an example architecture 100 in which two users carry respective mobile computing devices 102(1) and 102(2) within a particular building 104. While FIG. 1 illustrates these devices as mobile phones, the devices 102(1) and 102(2) may comprise any sort of mobile or stationary computing device, such as a tablet computing device, a laptop computer, a desktop computer, a game console, or the like. As illustrated, both users reside on a particular floor 106 of the building 104, which includes three wireless access points (WAPs) 108(1), 108(2), and 108(3). With use of one or more of these three WAPs and movement information of the device, each of the devices 102(1) and 102(2) may estimate its current location within the building 104. While FIG. 1 illustrates three WAPs located on a single floor 106, it is to be appreciated that any number of WAPs in any other location may be utilized to aid in determining a location of a respective mobile device. In addition, while FIG. 1 illustrates WAPs, it is to be appreciated that the techniques may alternatively use cellular towers, satellites, or any other type of component between which the devices 102(1) and 102(2) may measure wireless signal strength.

FIG. 1 further illustrates that the representative device 102(1) includes one or more processors 110, a display 112, an accelerometer 114, a gyroscope and compass 116 (hereinafter "gyroscope 116"), a wireless radio 118, and memory 120, which has access to a location-calculation module 122. While FIG. 1 illustrates the device 102(1) as including both the accelerometer 114 and the gyroscope 116, in other implementations a device may include one or the other, or may include another type of motion sensor altogether. For instance, the device 102(1) may include a barometer to indicate an elevation of the device (and, hence, whether the device moves up or down in Z space), or the like. In each instance, the location-calculation module 122 may utilize both information received from the motion sensor(s) along with a measured signal strength, such as a received signal strength indications (RSSIs) associated with the WAPs 108(1)-(3) to estimate a current location of the device. As is known and as used herein, an RSSI represents a generic radio receiver technology metric that indicates a power present in a received radio signal.

To estimate a location of the device as this location changes over time, the module 122 may first estimate an initial location of the device 102(1). To do so, the module 122 may first compare a current RSSI value measured at the device to a set of training data for the floor 106 of the building 104. Based on this comparison, the module 122 may determine a likelihood that the device resides at each of multiple locations from the training data and may select the location corresponding to the highest likelihood as the initial location of the device. For instance, the module 122 may identify an RSSI value from the training data the most closely matches the determined RSSI value, may determine the location corresponding to that RSSI value, and may set that location as the initial location. Alternatively, the module 122 may interpolate the initial location using the training data. In other instances, meanwhile, the module may determine the initial location using any other technique, such as by explicitly asking the user the location or the like.

To create the training data, an operator may initially determine an RSSI measured by a computing device at each possible location within the floor 106 of the building and may associate the RSSI with the respective location and the corresponding WAP. In some instances, the operator takes multiple measurements at a single location, either by taking multiple measurements with a single device over time and/or by utilizing multiple devices and taking multiple measurements at a single location in parallel. In either instance, the minimum measured RSSI and the maximum measured RSSI for each of the WAPs 108(1)-(3) defines an RSSI range for the particular WAP.

In some instances, the training data may be device-specific, meaning that each type, make, and/or model of device may be used to create training data for that particular device. As such, the type, make, and/or model of the devices 102(1) and 102(2) may be determined prior to attempting to employ the location-determination techniques, such that the correct training data is used. In addition, in some instances a user gripping a device may alter the measured RSSI values, potentially in different amounts based on a device's type, make, and/or model. As such, the type, make, and/or model may be referenced to determine how to compensate for altered RSSI values caused by a user holding a device.

After the training data, in the form of the RSSI ranges for each respective location and each of the WAPs 108(1)-(3), has been created, the location-calculation module 122 may compare current RSSI values for each of the WAPs 108(1)-(3) to the training data to estimate the initial location of the device 102(1) as discussed above. In some instances, the measured RSSI may be compared to the range for each WAP at each location on the floor 106 and a score is assigned to the location depending on whether or not the current RSSI falls within the range (and, potentially, where it falls within the range or how far it is from the range). In one example described below with reference to FIG. 4, a location is assigned a score of "1" if the currently measured RSSI falls within the location's range for a particular WAP and a score of "0" if it does not. A probabilistic model, such as a Hidden Markov Model (HMM) or a particle filter, is then used to determine a most likely current location of the device, which is set as the initial location.

After selecting an initial location, the module 122 selects multiple possible locations around the initial location. By selecting these possible locations, the module 122 determines that it will calculate respective probabilities that the device 102(1) resides at these locations as the locations are updated over time and in response to the device 102(1) moving. In some instances, the selected possible locations are evenly distributed about (e.g., around) the initial location, either in two-space or in three-space.

After selecting the possible locations about the initial location, the location-calculation module 122 may receive an indication from a motion sensor of the device that the device 102(1) is moving or has moved. For instance, the accelerometer 114 may provide an indication to the module 122 that the device has moved a certain distance or a certain threshold amount. In one example, the accelerometer provides an indication of movement each time the device 102(1) moves one "step", which is a certain predefined distance. In some instances, the gyroscope 116 may additionally provide a direction of movement. FIG. 1, for instance, illustrates that the device moves up and to the right while the device 102(2) moves to the left.

In response to the receiving an indication that the device 102(1) has moved in this direction, the location-calculation module 122 may update the possible locations to reflect this movement. For instance, each possible location may be shifted up and to the right in an amount equal to or otherwise based on the amount of movement. If the motion sensors illustrate that the device has also moved in the Z direction, then the location-module 122 may also update the possible locations to reflect this change.

After updating the possible locations, the location-calculation module 122 may identify those locations that have "moved" across a boundary of a wall without entering through a doorway or other egress. That is, the module 122 may identify those possible locations that, due to the change in location of the device 102(1), indicate that the device 102(1) has moved from a first side of a wall or other barrier to another side of the wall or barrier. To make this identification, the module 122 may reference a blueprint or other map of the building 104. After identifying any such ones of these locations, the module 122 may remove these locations from the list of possible locations, given that the user could not have crossed the wall in this manner. In addition, while moving behind a wall represents one way in which the module 122 may remove locations from a list of potential locations, the module 122 may remove locations in other manners in other implementations. For instance, in instances where the user and the device is within a car travelling on a road, points that go "off of the road" may be removed from a list of possible locations.

After filtering the possible locations in the manner described immediately above, the location-calculation module 122 may calculate a respective likelihood that the device 102(1) resides at each respective possible location. To do so, the module 122 may measure or receive another RSSI for each of the WAPs 108(1)-(3) after the device 102(1) has moved. After receiving these RSSIs, the module 122 may again compare the respective RSSIs to the previously measured RSSIs from the training data and may again calculate the likelihood that the device 102(1) is at each respective possible location. Because the module 122 is updating each of these probabilities, each likelihood at each instance in time is based at least in part on a respective previous likelihood of each respective possible location. In some instances, the module 122 may weight more recent RSSI values more heavily, may only reference RSSIs within a certain sliding window (e.g., the previous five RSSI measurements/comparisons), or the like. In some instances, the possible locations of the device may not directly correspond to locations in the training data. In these instances, the RSSI values associated with these locations may be interpolated using the locations and the corresponding RSSI values that are represented in the training data. As used herein, when a location is associated with a previously determined RSSI value, this previously determined RSSI value may be determined directly from the training data or may have been interpolated using the training data.

In addition to calculating probabilities after the device 102(1) moves, the module 122 may also periodically re-calculate probabilities for the possible locations. As such, regardless of the exact formulation used for calculating the probabilities, the module 122 may generally hone in on the device's actual location over time (i.e., the probabilities for locations close to or at the actual location of the device 102(1) may increase over time as the device 102(1) remains stationary).

Figure 2A:
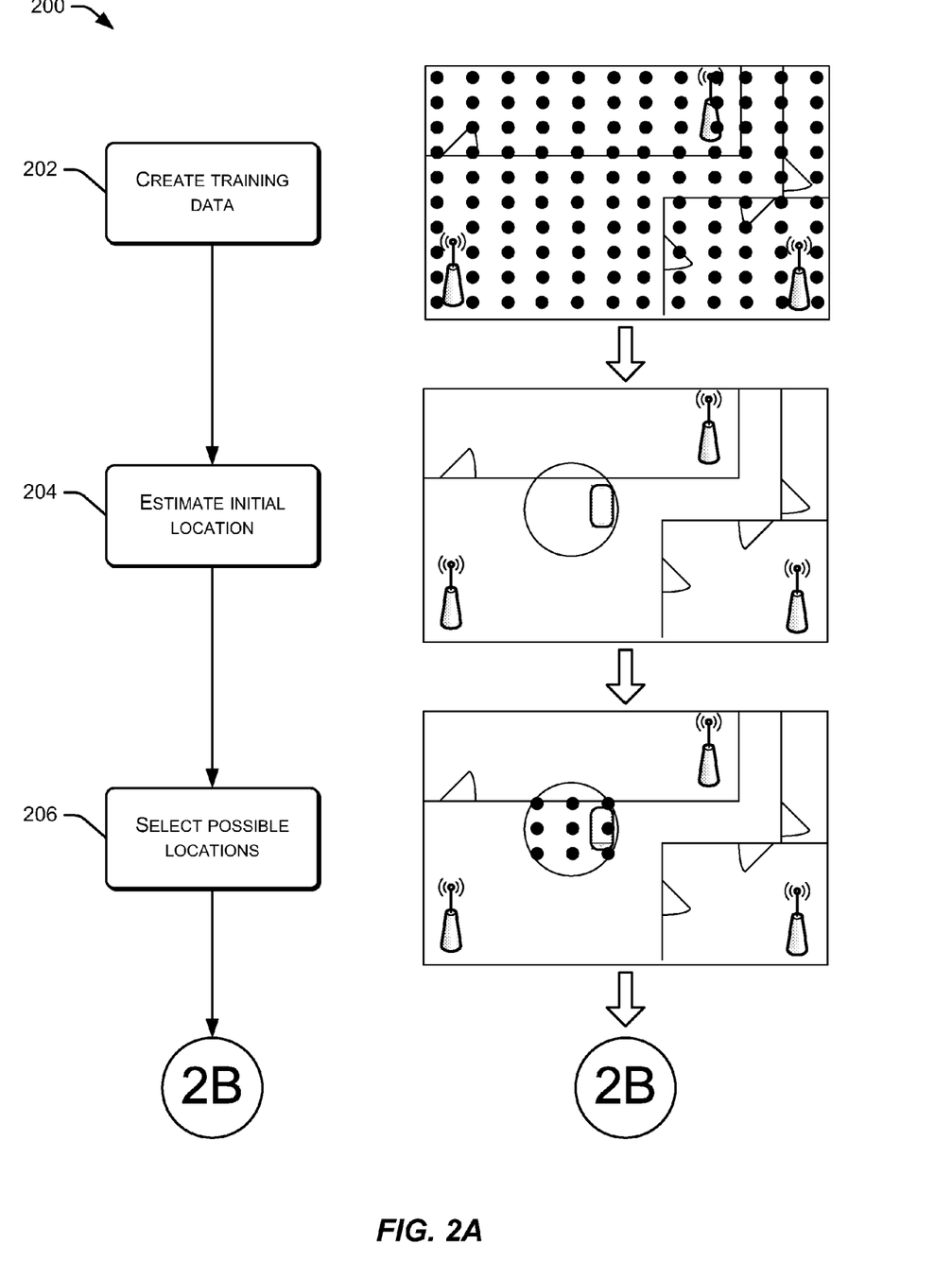
FIGS. 2A-2C illustrate an example process for precisely locating a device as the device moves over time. As illustrated, the process may reference both a wireless signal strength and indication(s) of when and how the device is moving in order to determine these locations over time.
Figure 2B:
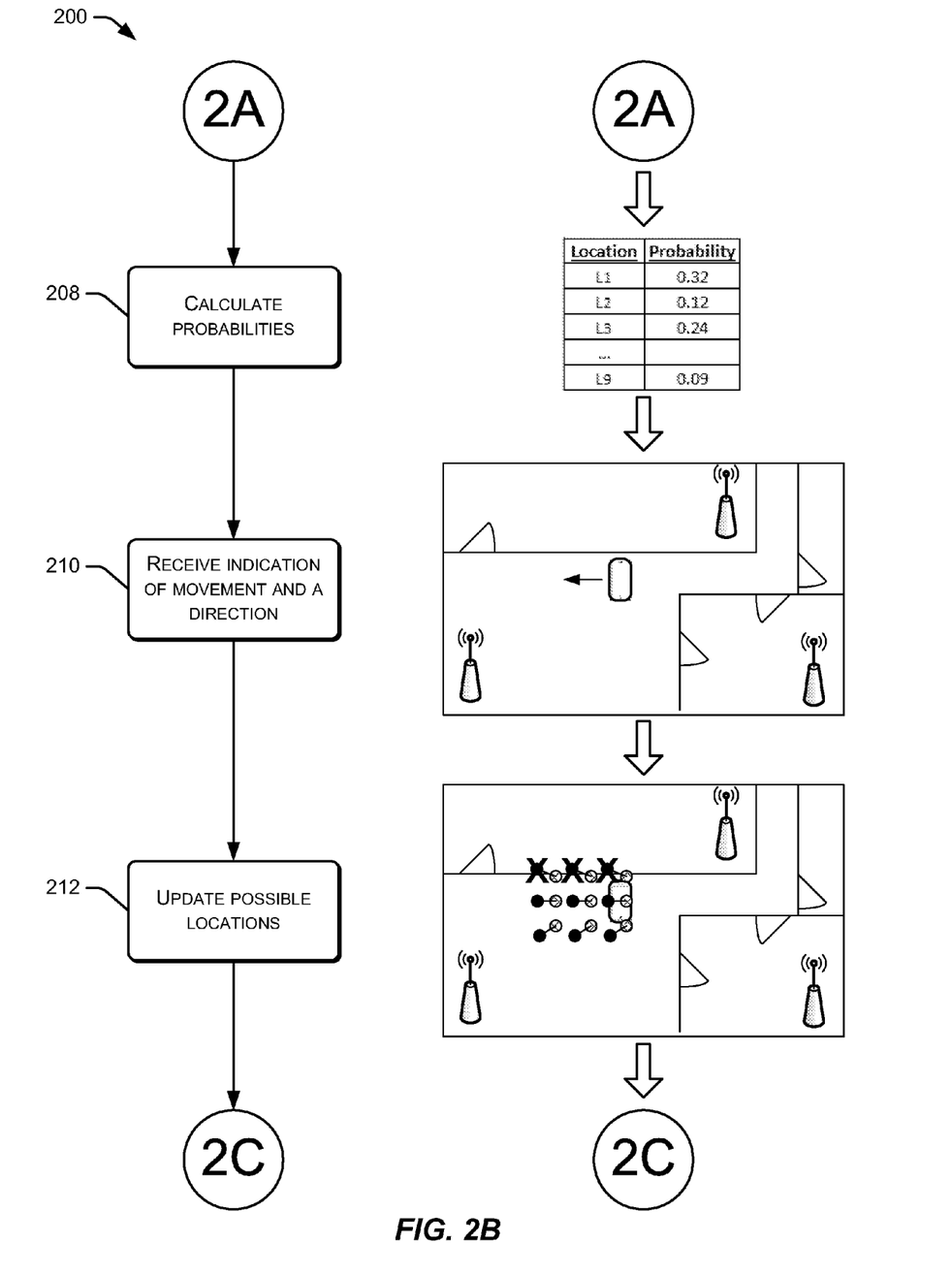
Figure 2C:
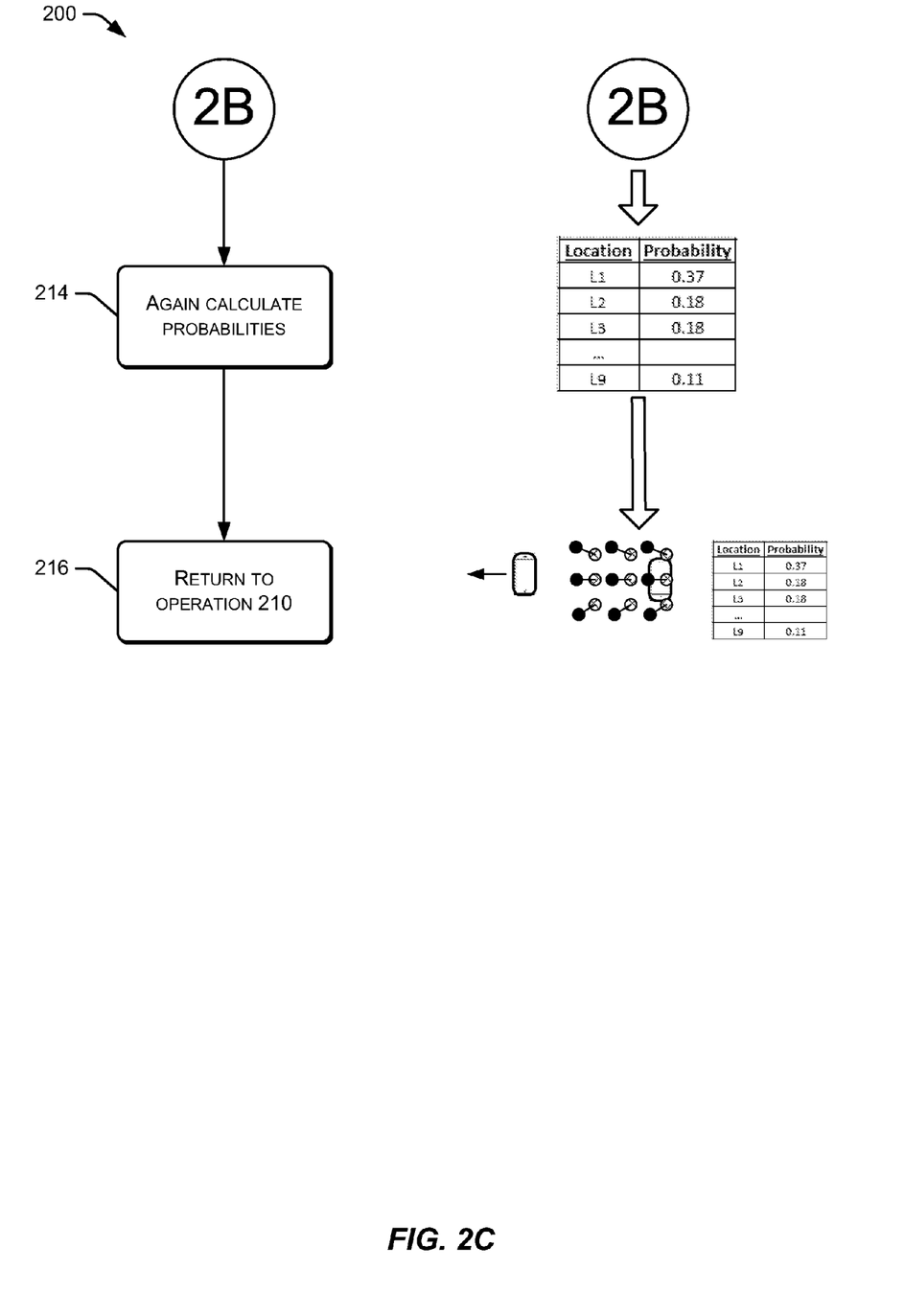

FIGS. 2A-2C illustrate an example process 200 for precisely locating a device as the device moves over time. As illustrated, the process may reference both a wireless signal strength and indication(s) of when and how the device is moving in order to determine these locations over time. While this process is described with reference to the architecture 100 discussed above, the described techniques may be equally applicable in many other architectures and environments.

The process 200, and each process described herein, is described as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 202, the process 200 creates training data for later use in determining the location of a device. As illustrated, the process 200 may measure RSSI values associated with each respective proximate WAP at multiple different locations within a building. Thereafter, the process 200 may estimate an initial location of a computing device at 204. For instance, in response to an application running on the device requesting location information for the device, the location-determination module 122 described above may determine an initial location of the device based on a first RSSI value measured at the device.

At 206, the process 200 may select possible locations of the client device, with these locations located near the estimated initial location. These possible locations may be evenly distributed about the initial location in some instances.

FIG. 2B continues the illustration of the process 200 and includes, at 208, the process 200 calculating a respective likelihood that the device resides in each respective possible location. For instance, the location-determination module may make this determination by comparing the first RSSI value to RSSI training data at the respective locations, with the likelihoods being determined using an HMM or a particle filter.

A HMM consists of a number of discrete "unknown" or "hidden" states, each of which correspond to a grid cell, which may be overlaid on a map or blueprint of a building floor. Each grid cell (representing "possible location") would be assigned a score or "likelihood" each time a device is determined to move by a certain amount (e.g., one step of the user). There is also a certain likelihood of "transition" to an adjacent cell on the map, which would depend on the sensor readings from a motion sensor, such as an accelerometer, a gyroscope, and/or a barometer. For example, if an accelerometer indicates that the user (and hence the device) has taken a new step, then the likelihood that the device has gone to the next cell from a current cell is set to "1", the likelihood that the device has stayed in the current cell is set to "0", and likelihood that the device has crossed a wall is set to zero. Thereafter, the likelihood of a "path" through cells is the product of observation/emission likelihoods and transition likelihoods (i.e., a product/sum, if working in log space, of individual cells along the path). The HMM therefore determines the most likely path that the device took through the grid cells (i.e., the most likely of the possible locations over time). After identifying the path having the maximum likelihood at any point of time, the grid cell at the end of this path is selected as the most likely grid cell at which the device resides, and the location corresponding to that grid cell becomes the estimate of the current location of the device.

Similar to using an HMM, a particle filter approach utilizes an infinite number of hidden states to determine a most likely location of the device based on multiple probability estimations. This infinite number of hidden states may be approximated by using a fixed number of "darts" or "particles" (a Monte Carlo approach). To begin darts are "thrown" at likely initial (x, y, z) locations on the map, with each dart/particle having a starting score/likelihood. A new WiFi observation increases the weight/score of each particle, and the likelier particles become heavier with the "heaviest" particle (i.e., the particular having the highest current likelihood) representing the estimated current location of the device at any given time. A new sensor reading (e.g., trigged by a new step detected by accelerometer or a reading of a new floor received from a barometer) moves the particle in the appropriate direction given by gyroscope, compass, and/or barometer. A particle hitting a wall is given a decreased or zero score and is removed from consideration. At any time, a weighted average of particle locations may be computed and a location corresponding to a particular having the highest likelihood of containing the device may be used as the estimated current location of the device.

At 210, the process 200 receives an indication that the device has moved and may receive an indication of the direction of the movement. In this example, the device may move to the left. At 212, and at least partly in response to receiving an indication of this movement, the process 200 may update the possible locations to reflect this movement. For instance, the process 200 may move each respective location to the left in an amount equal to or otherwise based upon the movement of the device. In some instances, the possible locations may be updated with an amount of randomness introduced into the update to take into account the potential error of the direction or movement indication provided by the motion sensor(s). In the illustrated example, for instance, some of the possible locations have been updated to reflect a change generally left and slightly upwards, while others have been updated to reflect a change straight to the left (in accordance with the reported direction), while still other possible locations are updated to reflect a change generally to the left and slightly downwards. If, as in the illustrated examples, some locations are now on an opposite side of the wall, then these locations may be removed from subsequent likelihood calculations, given that a user—and hence the device—could not have moved through the wall in that manner.

FIG. 2C continues the illustration of the process 200. At 214, the process 200 again calculates the probabilities that the device resides at the different locations. To do so, the process 200 may take a new RSSI measurement and may compare these new values to previously measured RSSI values from the training data at the updated possible locations. In some instances, the probabilistic model that is used may take into account previous probabilities of the different possible locations. At 216, the process 200 returns to operation 210, indicating that the process 200 may continue to update the possible locations and re-calculate probabilities that the device resides at these locations in response to the device moving through the building or other environment.

Figure 3:
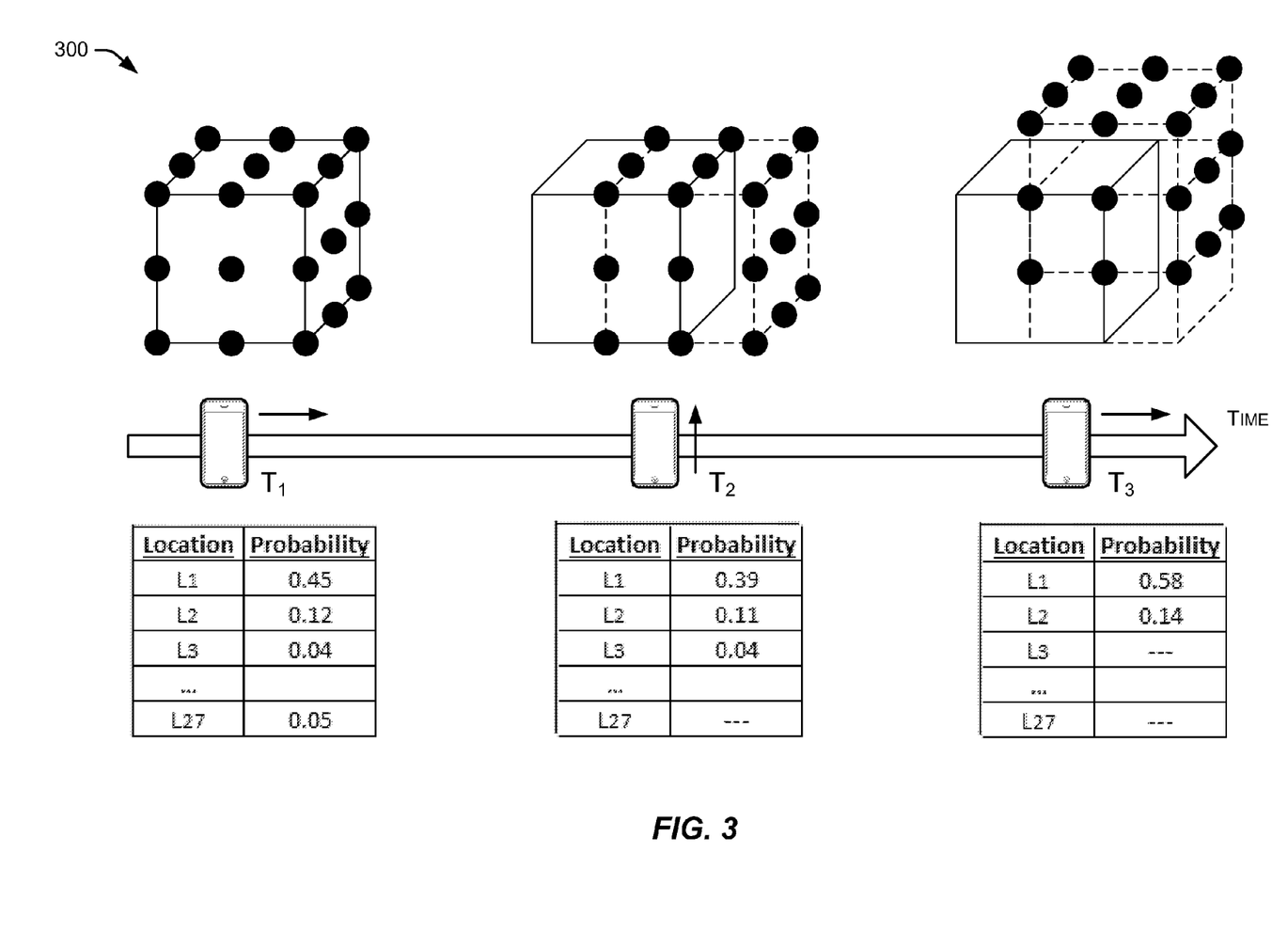
FIG. 3 illustrates an example scenario where a device moves over time and its location is estimated based on wireless signal strengths and the movement of the device.

FIG. 3 illustrates an example scenario 300 where a device moves over time and its location is estimated based on wireless signal strengths and the movement of the device. At time T1, this figure illustrates that twenty-seven possible locations have been selected as a possible location of a particular device (as represented by the points in the 3×3×3 cube). In addition, FIG. 3 illustrates that the device moves to the right at T1. As such, at time T2 the location-determination module 122 has updated the possible locations to reflect this movement. Thereafter, the likelihood that the device resides at each possible location is re-calculated based on the previous probabilities of the respective possible locations and based on a new comparison between newly measured RSSI values and training data associated with the updated possible locations. In addition, after or while re-calculating these probabilities, the device moves upwards as illustrated at T2. In response, the possible locations have again been updated at time T3 and the probabilities associated with these updated locations have been re-calculated based on a comparison between newly measured RSSI values and corresponding training data.

Figure 4:
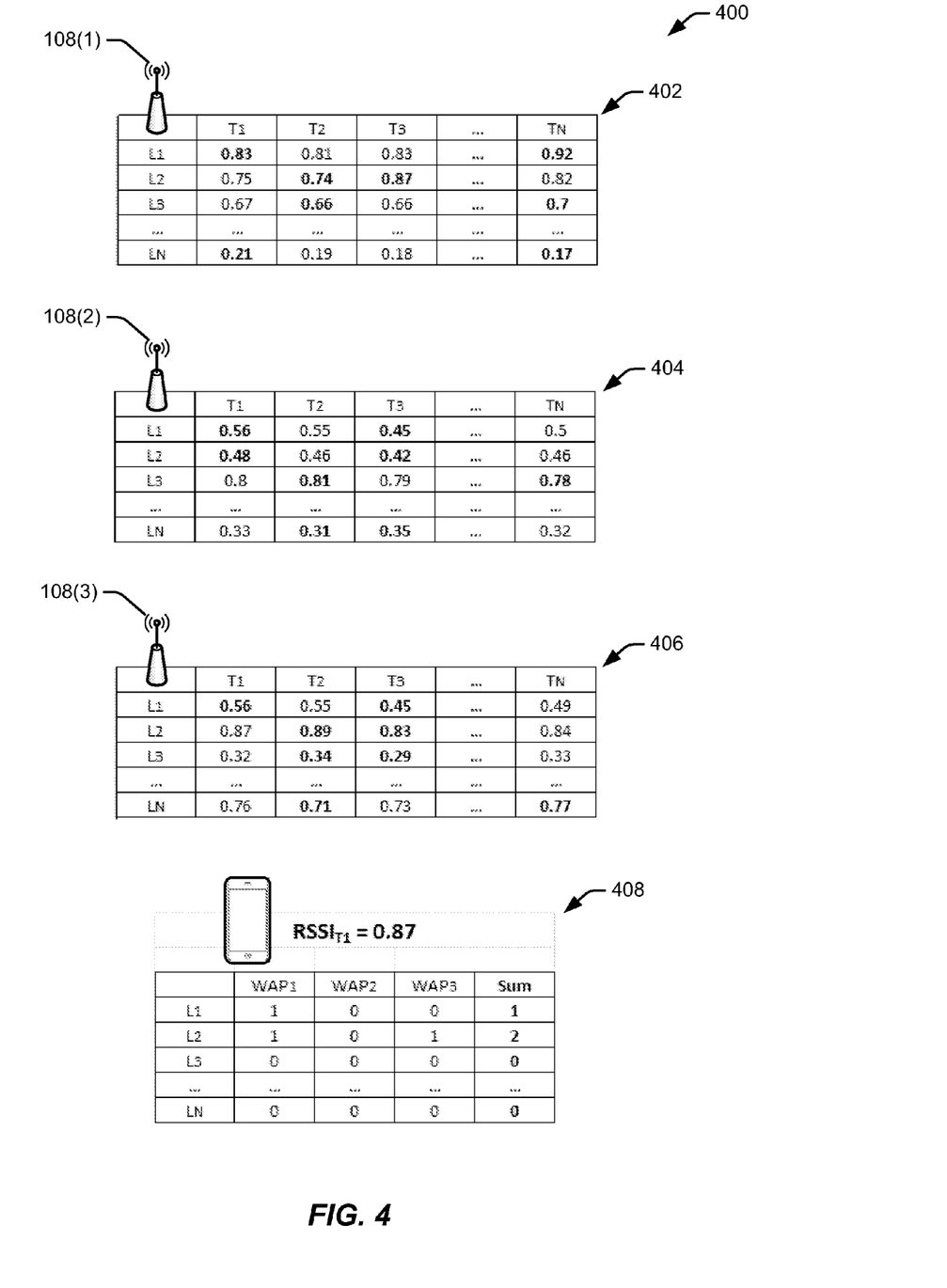
FIG. 4 illustrates one manner in which a current location of a device may be estimated using probabilities based on current and previously measured wireless signal strengths.

FIG. 4 illustrates one manner 400 in which a current location of a device may be estimated using probabilities based on current and previously measured wireless signal strengths. First, a table 402 represents training data measured for the first WAP 108(1). As illustrated, the training data includes RSSI values measured for locations L1, L2, Ln. In addition, these values have been measured at a number of different times T1, T2, . . . , Tn. For each location, the RSSI values measured at different times define a range of RSSI values for a particular location. For instance, for a first location, L1, the minimum and maximum measured RSSI values define a range of 0.83-0.92 for the WAP1. A table 404, meanwhile, similarly indicates a number of RSSI ranges for the second WAP 108(2), while a table 406 indicates a number of RSSI ranges for the third WAP 108(3).

After creating the training data, this training data may be utilized to determine a location of a mobile device as this device moves over time. A table 408, for instance, indicates how probabilities may be calculated using this training data. As illustrated, at a time T1 after the creating of the training data, a device may measure an RSSI having an example value of 0.87. The location-determination module 122, described above, may compare this RSSI value to the RSSI values for the three WAPs 108(1)-(3) and across the multiple different locations. If the measured RSSI value falls within a range corresponding to a particular location for one of the WAPs, then a score of "1" may be assigned to the particular location, while a score of "0" may be assigned if the RSSI value is not within the range. As illustrated, these scores across the three routers may then be summed, with these values being used to calculate probabilities that the device resides at the particular location. As illustrated, a first location, L1, has a summed score of "1", a second location, L2, has a summed score of "2", a third location, L3, has a summed score of "0", and an nth location, Ln, has a summed score of "0". Using this information, the probabilistic model used to assign probabilities to the respective locations will assign a higher likelihood to the device residing at a L2 as compared to L1, L3, and Ln.

Figure 5:
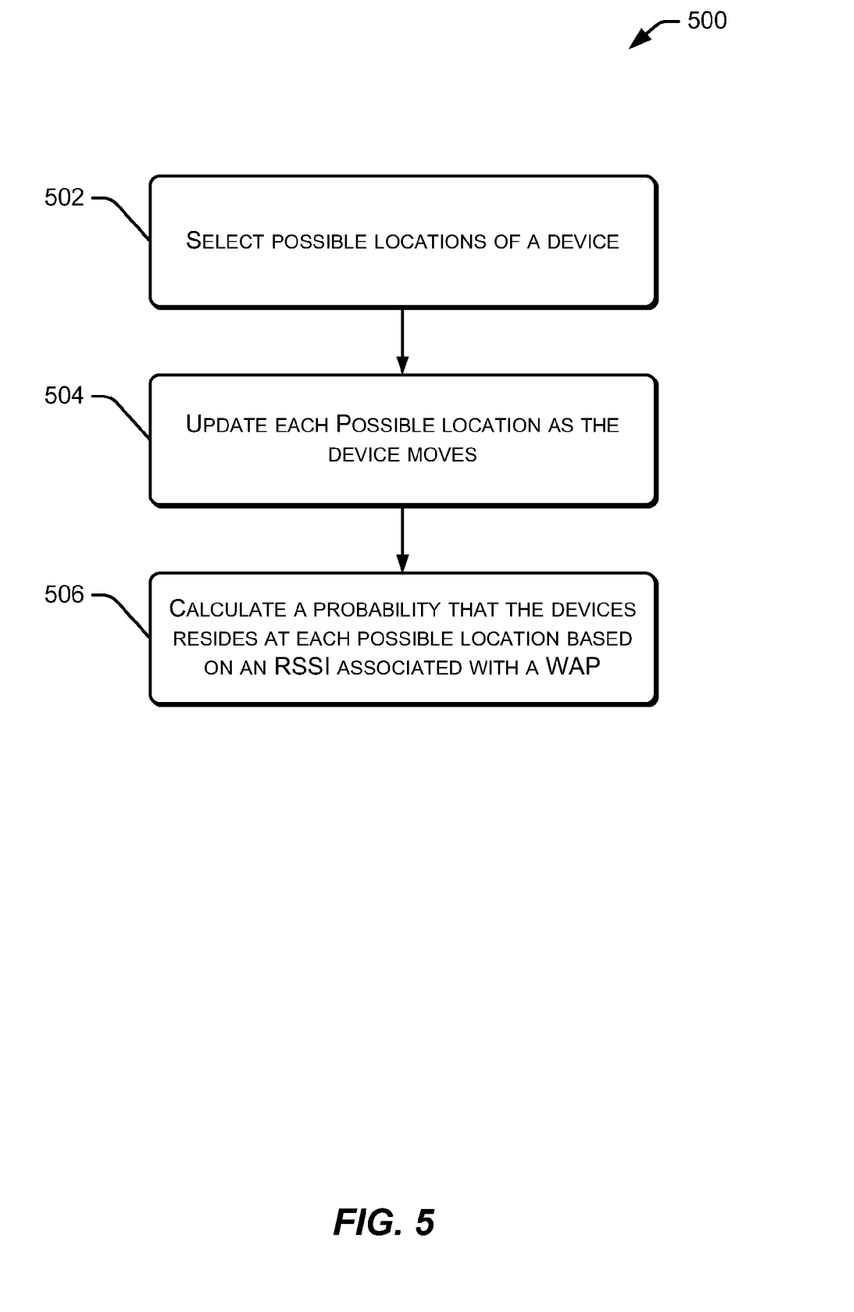
FIG. 5 illustrates an example process of calculating probabilities that a device resides at different possible locations based on RSSIs.

FIG. 5 illustrates an example process 500 of calculating probabilities that a device resides at different possible locations based on RSSIs. At 502, the process 500 selects possible locations of a device, which may be based on an estimated initial location of the device. At 504, the process 500 updates each of these possible locations as the device moves within an environment. At 506, the process 500 calculates a likelihood that the device resides at each possible location based on an RSSI associated with a particular WAP. Furthermore, the process 500 may continue to update these possible locations and the corresponding probabilities as the device moves over time.

Figure 6:
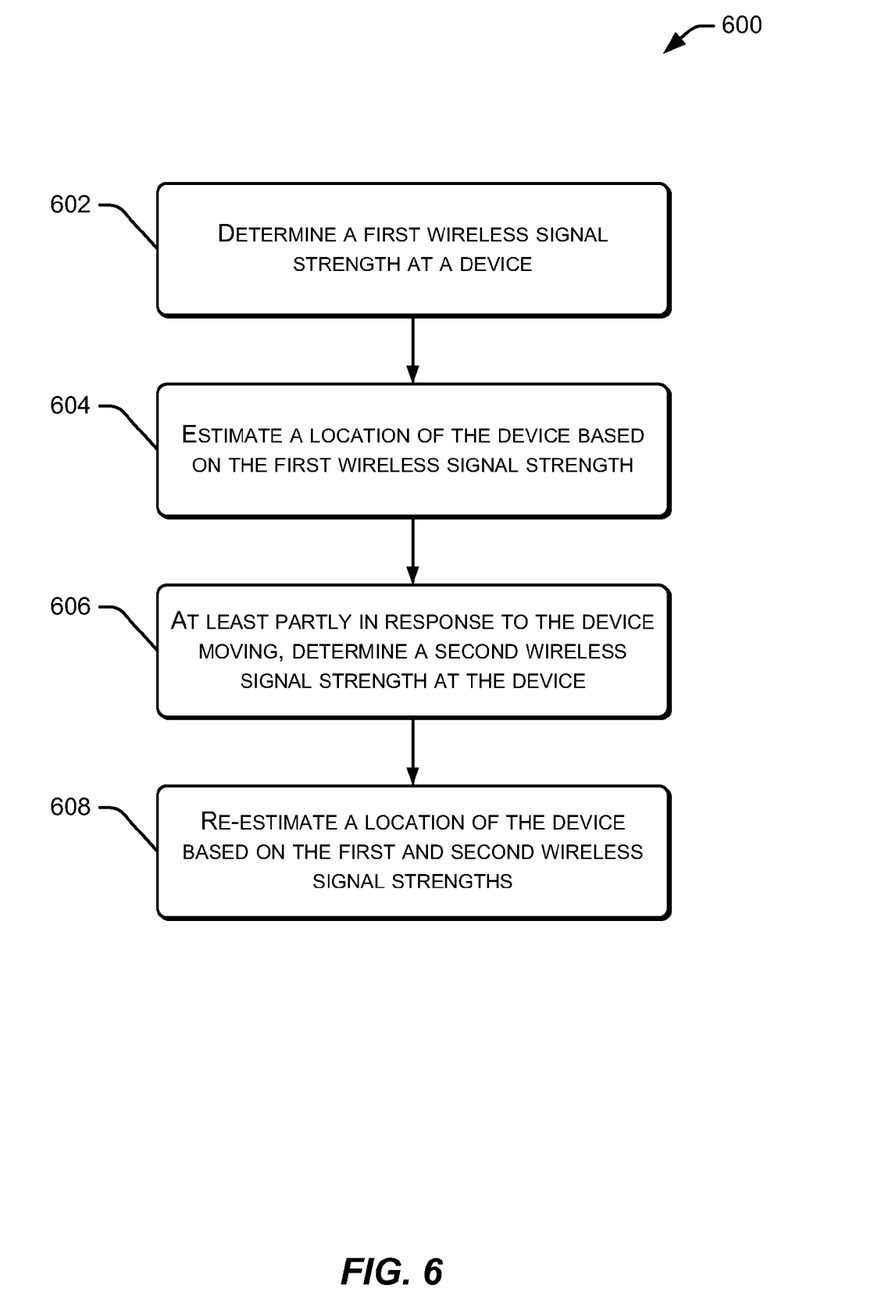
FIG. 6 illustrates an example process of estimating a location of a device based on a first wireless signal strength measured at the device, determining a second wireless signal strength based on the device moving, and again estimating the location of the device based on the first and second wireless signal strengths.

FIG. 6 illustrates another example process 600. At 602, the process 600 determines a first wireless signal strength at a device, such as an RSSI value. At 604, the process estimates a location of the device based on the first wireless signal strength measured. Next, at 606, the process 600 determines a second wireless signal strength based on the device moving and, at 608, again estimates the location of the device based on the first and second wireless signal strengths.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
an accelerometer;
one or more processors; and
one or more non-transitory computer-readable media storing computer-executable instructions that, when executed by the one or more processors, cause the one or more processors to perform acts comprising:
determining a possible location of a device;
determining, at a first time, a first received signal strength indication RSSI representing a strength of a connection between the device and a wireless access point (WAP) at the first time;
analyzing the first RSSI determined at the first time and a previously determined RSSI at the possible location;
determining, based at least in part on the analyzing of the first RSSI determined at the first time and the previously determined RSSI at the possible location, a first likelihood that the device is located at the possible location;
receiving an indication from the accelerometer that the device has moved since the determining of the first RSSI at the first time;
at least partly in response to receiving the indication:
determining a new possible location;
determining, at a second time, a second RSSI representing a strength of a connection between the device and the WAP at the second time;
analyzing the second RSSI determined at the second time and previously determined RSSI at the new possible location; and
determining, for the new possible location, a second likelihood that the device is located at the new possible location, the second likelihood based at least in part on the first likelihood and the analyzing of the second RSSI determined at the second time and the previously determined RSSI at the new possible location; and
providing the new possible location.

2. The device as recited in claim 1, wherein determining the second likelihood comprises updating the first likelihood based at least in part on the analyzing of the second RSSI determined at the second time and the previously determined RSSI at the new possible location.

3. The device as recited in claim 1, further comprising at least one of a gyroscope, a compass, or a barometer, the acts further comprising receiving an indication of a direction that the device has moved from the at least one of the gyroscope, the compass, or the barometer, and wherein the determining of the new possible location comprises selecting a location that are adjacent to the possible location in a direction corresponding at least in part to the indication of the direction that the device has moved.

4. A computer-implemented method comprising:
   determining possible locations of a device;
   determining for a first possible location of the possible locations, a first likelihood that the device resides at the first possible location;
   receiving motion data from a motion sensor;
   determining a second possible location of the device based at least in part on updating the first possible location based at least in part on the motion data;
   receiving an indication of signal strength between the device at the second possible location and a wireless access point (WAP);
   analyzing the indication of signal strength and data representing a second signal strength at the second possible location;
   determining a second likelihood that the device resides at the second possible location based at least in part on the first likelihood and the analyzing; and
   providing the second possible location.

5. The computer-implemented method as recited in claim 4, wherein the determining of the possible locations comprises:
   determining an initial signal strength between the device and the WAP when the device is at an initial location; and
   estimating the initial location by: (i) analyzing the initial signal strength and previously determined signal strengths associated with the WAP, (ii) identifying a closest matching signal strength based at least in part on the analyzing of the initial signal strength and the previously determined signal strengths associated with the WAP and (iii) determining a location associated with the closest matching signal strength, each of the previously determined signal strengths corresponding to a different location;
   and wherein the possible locations of the device are based at least in part on the estimated initial location.

6. The computer-implemented method as recited in claim 4, the acts further comprising receiving an indication from an accelerometer of the device that the device has moved.

7. The computer-implemented method as recited in claim 4, the acts further comprising receiving an indication of a direction in which the device has moved, and wherein the determining of the second possible location comprises selecting a location that is adjacent to the first possible location and in the indicated direction.

8. The computer-implemented method as recited in claim 7, wherein the indication of the direction is received from at least one of a gyroscope, a compass, or a barometer of the device.

9. The computer-implemented method as recited in claim 4, the acts further comprising:
   continuing to determine new additional possible locations of the device based at least in part on movement of the device; and
   re-determining a new additional likelihood that the device resides at a new additional possible location of the new additional possible locations based at least in part on a respective signal strength between the device and the WAP.

10. The computer-implemented method as recited in claim 9, wherein the re-determining is based at least in part on determining an end of a path determined via a Hidden Markov Model (HMM) or a current location determined by a particle filter.

11. The computer-implemented method as recited in claim 4, the acts further comprising:
   determining new possible locations of the device including the second possible location based at least in part on updating the possible locations based at least in part on the motion data;
   determining whether any of the new possible locations are on an opposite side of a wall from a location determined in a previous possible location; and
   determining a likelihood for each new possible location that is not on the opposite side of the wall.

12. The computer-implemented method as recited in claim 4, wherein the determining the second likelihood comprises updating the first likelihood based at least in part on the analyzing of the indication of signal strength and the data representing the second signal strength at the second possible location.

13. A method comprising:
   determining a first wireless signal strength at a device;
   determining, based at least in part on the first wireless signal strength, a first likelihood that the device is at a first location;
   receiving an indication from an accelerometer that the device has moved since the determining of the first wireless signal strength;
   at least partly in response to receiving the indication:
      determining a second location of the device, the second location being associated with the first location;
      determining a second wireless signal strength at the device at the second location;
      analyzing the second wireless signal strength and a previously determined signal strength at the second location; and
      determining a second likelihood that the device resides at the second location based at least in part on the first likelihood and the analyzing; and
   providing the second location.

14. The method as recited in claim 13, wherein determining the first likelihood comprises:
   analyzing the first wireless signal strength and each previously determined wireless signal strength of a first set of previously determined wireless signal strengths, each previously determined wireless signal strength of the first set corresponding to a particular location.

15. The method as recited in claim 13, wherein determining the second likelihood that the device resides at the second location is further based at least in part on analyzing the first wireless signal strength and previously determined wireless signal strengths at the first location.

16. The method as recited in claim 13, wherein the indication comprises a direction in which the device has moved, and wherein the determining of the second location is based at least in part on the indication.

17. A device comprising:
   one or more processors; and
   one or more non-transitory computer-readable media storing computer-executable instructions that, when executed by the one or more processors, cause the one or more processors to perform acts comprising:
      determining a likelihood that the device resides at a first location based at least in part on a first signal strength;
      determining a likelihood that the device resides at a second location based at least in part on the first signal strength;
      receiving an indication that the device has moved;
      at least partly in response to receiving the indication;

determining a third location and a fourth location, the third location and the fourth location being respectively associated with the first location and the second location;

determining a second signal strength;

analyzing the second signal strength and respective previously determined signal strengths at the third location and the fourth location;

determining a likelihood that the device resides at the third location based at least in part on the likelihood that the device resided at the first location and the analyzing; and determining a likelihood that the device resides at the fourth location based at least in part on the likelihood that the device resided at the second location and the analyzing; and providing the third location and the fourth location.

18. The device as recited in claim 17, further comprising an accelerometer to provide the indication that the device has moved.

19. The device as recited in claim 17, further comprising at least one of a gyroscope, a compass, or a barometer to provide an indication of a direction of that the device has moved, and wherein the determining the third and fourth locations occurs based at least in part on the indication of the direction.

20. The device as recited in claim 17, wherein the first and second signal strengths comprise respective received signal strength indications (RSSIs) between the device and a wireless access point (WAP).

21. The device as recited in claim 17, wherein the first and second signal strengths comprise respective received signal strengths between the device and a cellular tower or satellite.

* * * * *